United States Patent
Thompson et al.

(10) Patent No.: US 11,966,277 B2
(45) Date of Patent: Apr. 23, 2024

(54) STORAGE ERROR IDENTIFICATION/REDUCTION SYSTEM

(71) Applicant: Dell Products L.P., Round Rock, TX (US)

(72) Inventors: Leland W. Thompson, Tustin, CA (US); Ali Aiouaz, Bee Cave, TX (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 17/583,272

(22) Filed: Jan. 25, 2022

(65) Prior Publication Data
US 2023/0236913 A1 Jul. 27, 2023

(51) Int. Cl.
*G06F 11/00* (2006.01)
*G06F 11/07* (2006.01)

(52) U.S. Cl.
CPC ...... *G06F 11/0751* (2013.01); *G06F 11/0727* (2013.01)

(58) Field of Classification Search
CPC .......... G06F 11/0751; G06F 11/0727
USPC ................ 714/763, 764, 766, 773
See application file for complete search history.

(56) References Cited

U.S. PATENT DOCUMENTS

| | | | | |
|---|---|---|---|---|
| 8,745,453 B1 * | 6/2014 | Sutardja | ........... | G11C 11/56 714/766 |
| 11,726,665 B1 * | 8/2023 | Sabbag | ........... | G06F 3/0619 711/154 |
| 2012/0079189 A1 * | 3/2012 | Colgrove | ........... | G06F 11/3055 709/217 |
| 2012/0079317 A1 * | 3/2012 | Nelogal | ........... | G06F 11/1092 714/6.22 |
| 2013/0117640 A1 * | 5/2013 | Tai | ........... | G06F 11/1048 714/780 |
| 2016/0035417 A1 * | 2/2016 | Park | ........... | G11C 13/0033 365/148 |
| 2018/0277226 A1 * | 9/2018 | Tokutomi | ........... | G11C 16/34 |
| 2021/0117257 A1 * | 4/2021 | Hoang | ........... | G06F 11/0772 |
| 2021/0303397 A1 * | 9/2021 | Lin | ........... | H03M 13/458 |
| 2022/0137859 A1 * | 5/2022 | Ahn | ........... | G06F 3/0679 711/154 |

(Continued)

*Primary Examiner* — Shelly A Chase
*Assistant Examiner* — Osman M Alshack
(74) *Attorney, Agent, or Firm* — Joseph Mencher

(57) ABSTRACT

A storage error identification/reduction system includes a storage error identification/reduction subsystem coupled to a storage subsystem including a block. The storage error identification/reduction subsystem receives first data, and writes the first data to first storage locations in the block while writing storage error identification data to second storage location(s) in the block that each are located adjacent at least one of the first storage locations, with the storage error identification data including predetermined values that are written to predetermined locations included in the second storage location(s) in the block. The storage error identification/reduction subsystem then reads the storage error identification data from the second storage location(s) and, based on the predetermined values and predetermined locations of the storage error identification data, identifies errors resulting from the reading of the storage error identification data. Based on the errors, the storage error identification/reduction subsystem determines and performs error reduction operation(s).

20 Claims, 14 Drawing Sheets

(56) References Cited

U.S. PATENT DOCUMENTS

| | | | |
|---|---|---|---|
| 2022/0138164 A1* | 5/2022 | Brahma Raju | G06F 16/1865 707/675 |
| 2022/0319589 A1* | 10/2022 | Nowell | G11C 16/30 |
| 2022/0358016 A1* | 11/2022 | Park | G06F 11/1415 |
| 2023/0063666 A1* | 3/2023 | Goode | G11C 29/44 |

* cited by examiner

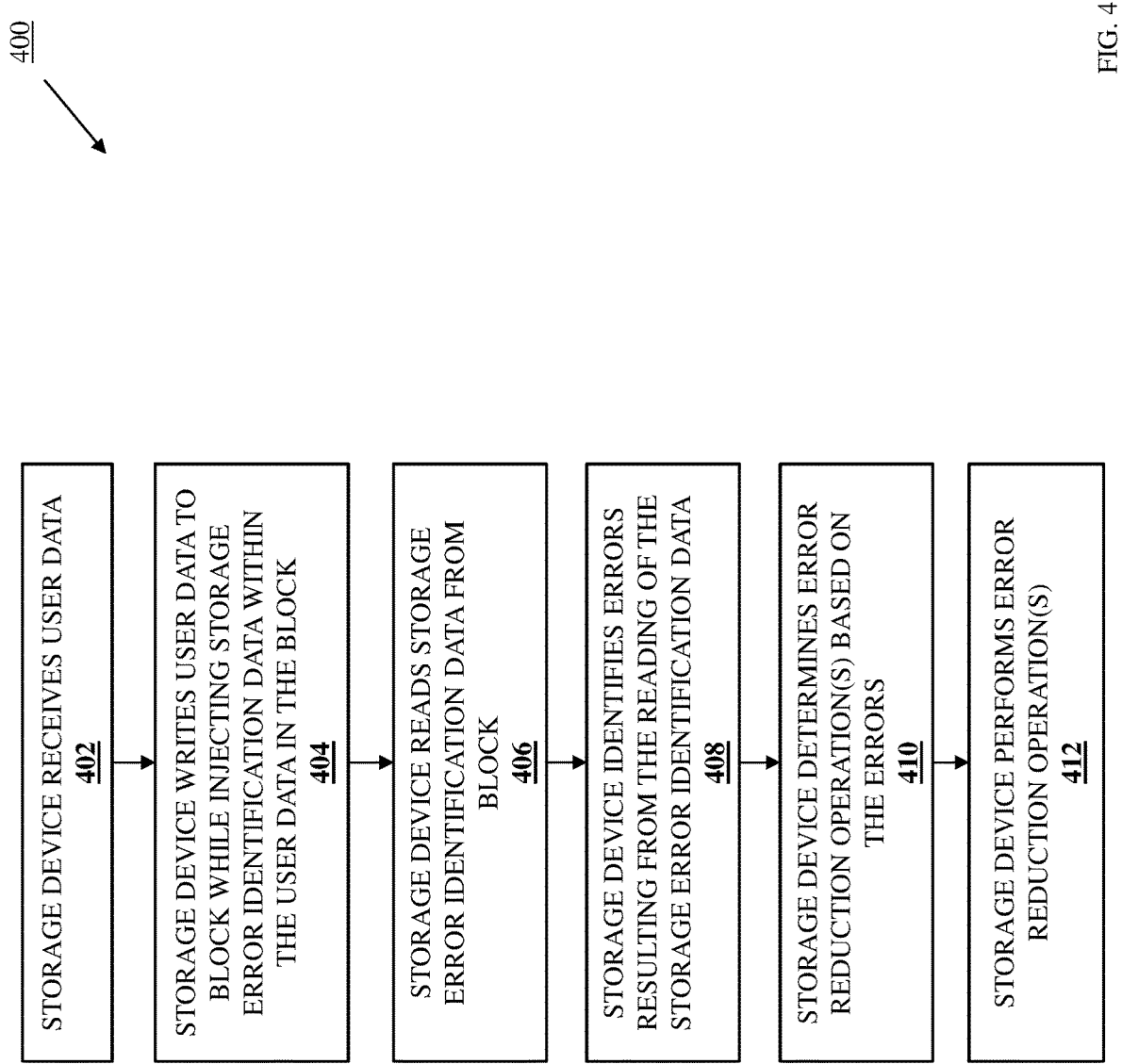

STORAGE ERROR IDENTIFICATION/REDUCTION SYSTEM

BACKGROUND

The present disclosure relates generally to information handling systems, and more particularly to identifying and reducing errors associated with the storage of data in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include storage devices such as, for example, Solid State Drive (SSD) storage devices that utilize flash-based storage subsystems that allow those SSD storage devices to operate at higher speeds than conventional Hard Disk Drive (HDD) storage devices. However, the storage characteristics of flash-based storage subsystems can change over time due to a variety of effects, including temporary effects such as program disturb effects, read disturb effects, and retention time effects, as well as physical effects such as program/erase cycle effects that operate to degrade the flash-based storage subsystem, and/or other effects that one of skill in the art in possession of the present disclosure would recognize as effecting a relative "health" of the flash-based storage subsystem. The changing health/storage characteristics of flash-based storage subsystems can increase the number of errors in data that is read from the flash-based storage subsystems (e.g., errors resulting from bits that store data (e.g., a "0" or a "1") "flipping" (e.g., from a "1" to a "0")).

Furthermore, "uncorrectable error" situations can arise in which errors that result during the reading of data reach a level that exceeds the capabilities of error correction information, which is provided along with that data to correct errors that result during the reading of that data. In such uncorrectable errors situations, the storage device may, for example, shift the voltage reference levels within cells of the flash-based storage subsystems to attempt to reduce the number of errors that result when reading that data to a level that is within the capabilities of the error correction information, thus allowing that data to be read. However, such voltage level shifting operations are generally conducted based on a "best guess" with regard to the details related to how the voltage reference level(s) will be shifted, and iterated repeatedly in an attempt to reduce errors to a level that will allow the data to be read. In the event that the number of errors that occur during the reading of data cannot be reduced to within the error correction capabilities of the error correction information, other data recovery techniques (e.g., Redundant Array of Independent Disk (RAID) techniques) must be used to recover the data, and in either situation there is no way to determine if the errors are a result of the physical effects or temporary effects like those discussed above.

Furthermore, in the event the number of errors that occur during the reading of data can be reduced to within the error correction capabilities of the error correction information, the storage device may operate to "move" the data by writing that data to a new storage location in the flash-based storage subsystem in an attempt to "refresh" that data, as the writing of the data to the new storage location operates to "reset" the temporary effects discussed above for that data (e.g., the new storage location will have no program disturb effects, read disturb effects, or retention time effects immediately following that write operations). However, in such situations it still will not be known whether the errors are a result of the physical effects or temporary effects like those discussed above, and such a determination requires data to be written to the old storage location and then read again, which is a processing-intensive and time-intensive.

Accordingly, it would be desirable to provide a storage error identification/reduction system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage error identification/reduction engine that is configured to: receive first data; write the first data to a plurality of first storage locations in a block included in a storage subsystem while writing storage error identification data to at least one second storage location in the block that is located adjacent at least one of the plurality of first storage locations, wherein the storage error identification data includes predetermined values that are written to predetermined locations included in the at least one second storage location in the block; read the storage error identification data from the at least one second storage location; identify, based on the predetermined values and predetermined locations of the storage error identification data, errors resulting from the reading of the storage error identification data; determine, based on the errors, at least one error reduction operation; and perform the at least one error reduction operation.

BRIEF DESCRIPTION OF THE DRAWINGS

FIG. 4 is a flow chart illustrating an embodiment of a method for identifying and reducing storage errors.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
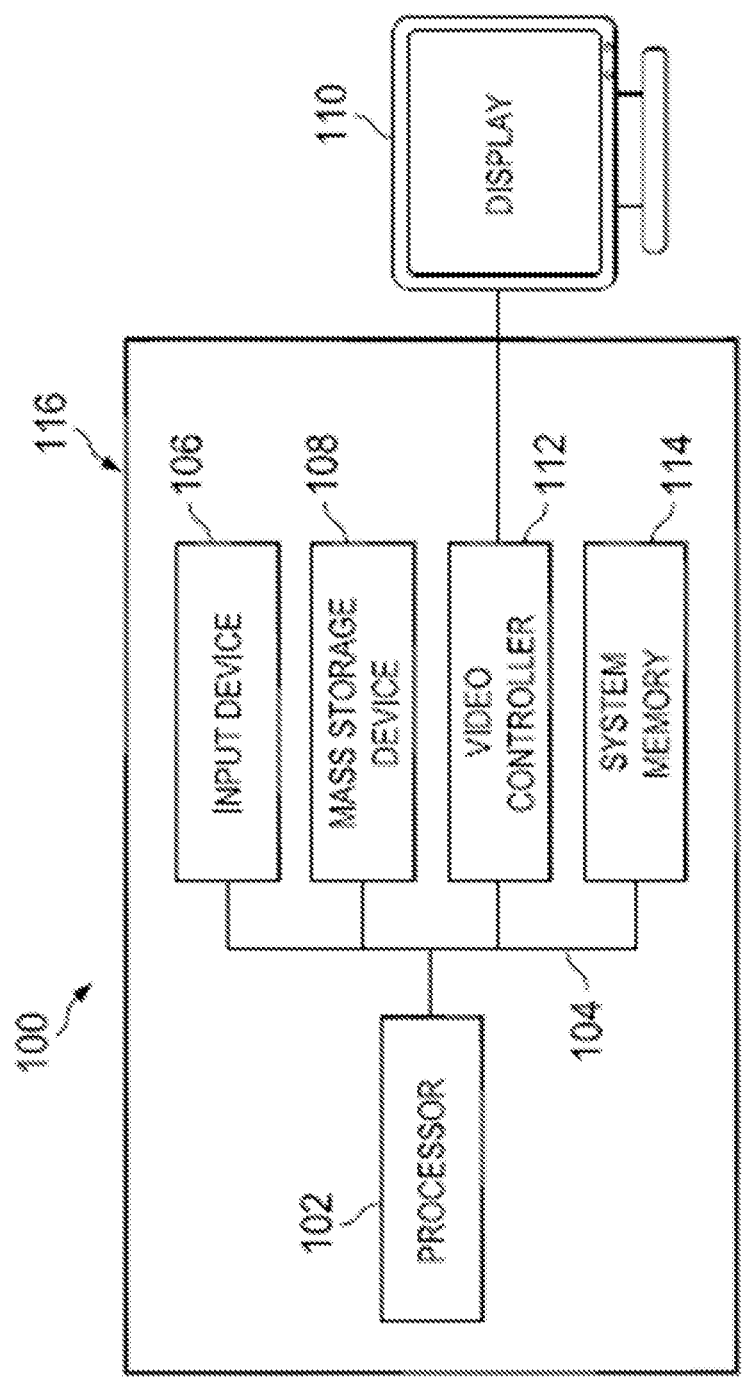
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
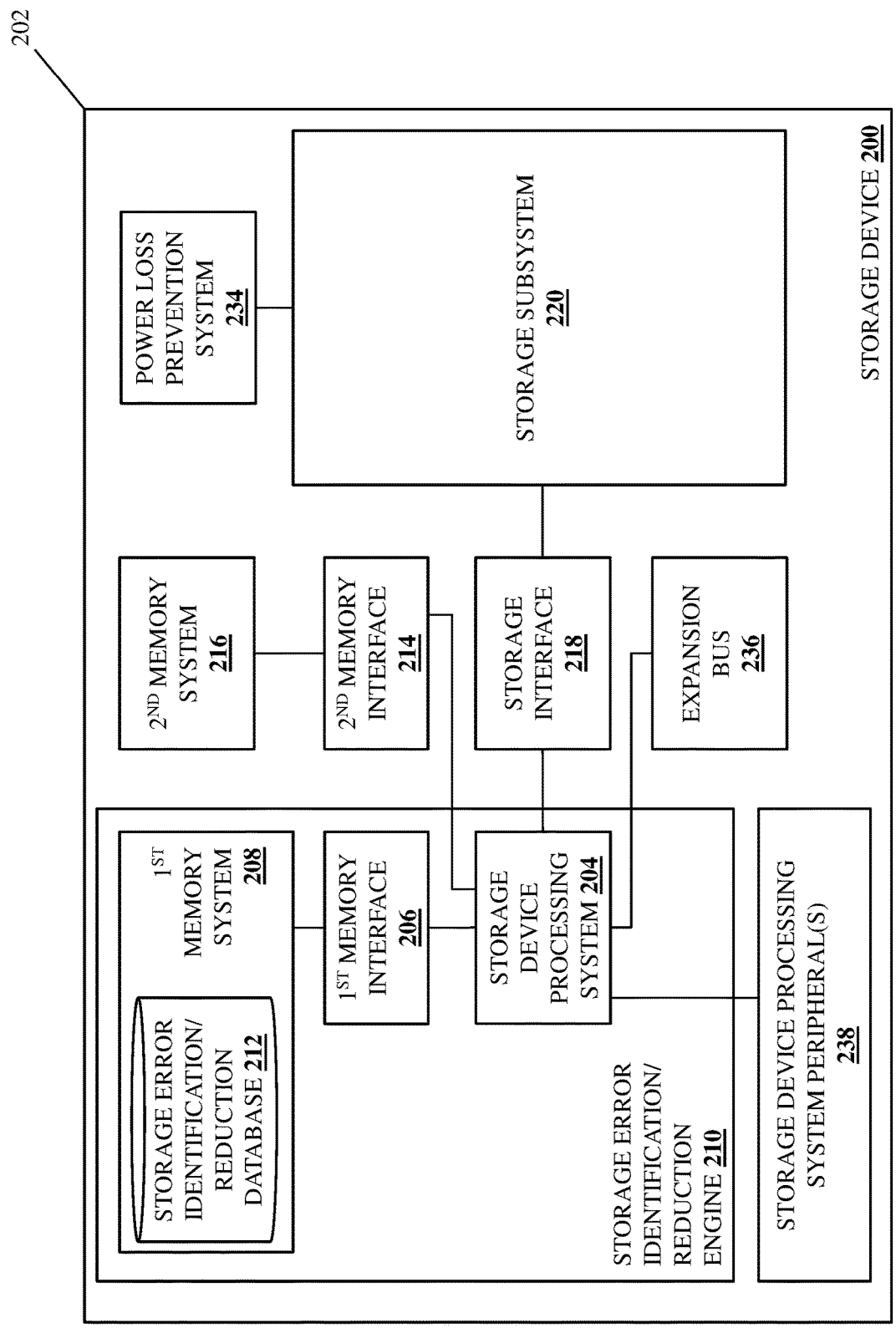
FIG. 2A is a schematic view illustrating an embodiment of a storage device that may include the storage error identification/reduction system of the present disclosure.

Referring now to FIG. 2A, an embodiment of a storage device 200 is illustrated that may provide one or more storage devices in a storage system including in a computing device such as a server device, a desktop computing device, a laptop/notebook computing device, a tablet computing device, a mobile phone, and/or other computing device that would be apparent to one of skill in the art in possession of the present disclosure. In an embodiment, the storage device 200 may be provided by the IHS 100 discussed above with reference to FIG. 1 and/or may include some or all of the components of the IHS 100, and in the specific examples below is illustrated and described as being provide by an SSD storage device (e.g., a Non-Volatile Memory express (NVMe) SSD storage device). However, while illustrated and discussed as being provided by a particular storage device, one of skill in the art in possession of the present disclosure will appreciate that the teachings of the present disclosure may be implemented in other storage devices that are configured to operate similarly as the storage device 200 discussed below. In the illustrated embodiment, the storage device 200 includes a chassis 202 that houses the components of the storage device 200, only some of which are illustrated and discussed below.

For example, the chassis 202 may house a storage device processing system 204 (which may include the processor 102 discussed above with reference to FIG. 1 such as a Central Processing Unit (CPU), storage device controller, and/or other processing systems that one of skill in the art in possession of the present disclosure would recognize as being provided in an SSD storage device) that is coupled via a first memory interface 206 (e.g., a Dual Data Rate (DDR) interface) to a first memory system 208 (which may include the memory 114 discussed above with reference to FIG. 1 such as Dynamic Random Access Memory (DRAM) devices and/or other memory systems that would be apparent to one of skill in the art in possession of the present disclosure). As illustrated in the specific examples provided herein, the first memory system 208 may include instructions that, when executed by the storage processing system 204, cause the storage device processing system 204 to provide a storage error identification/reduction engine 210 that is configured to perform the functionality of the storage error identification/reduction engines and/or storage devices discussed below.

As also illustrated in the specific examples provided herein, the first memory system 208 may include a storage error identification/reduction database 212 that is configured to store any of the information utilized by the storage error identification/reduction engine 210 discussed below. However, one of skill in the art in possession of the present disclosure will recognize that other embodiments of the present disclosure may provide the storage error identification/reduction database 212 in other locations while remaining within the scope of the present disclosure as well. For example, as illustrated, the storage device processing system 204 may also be coupled via a second memory interface 214 (e.g., a Storage Class Memory (SCM) interface) to a second memory system 216 (which may include the memory 114 discussed above with reference to FIG. 1 such as SCM devices and/or other memory systems that would be apparent to one of skill in the art in possession of the present disclosure), and the storage error identification/reduction database 212 may be provided by the second memory system 216 while remaining within the scope of the present disclosure as well.

Figure 2B:
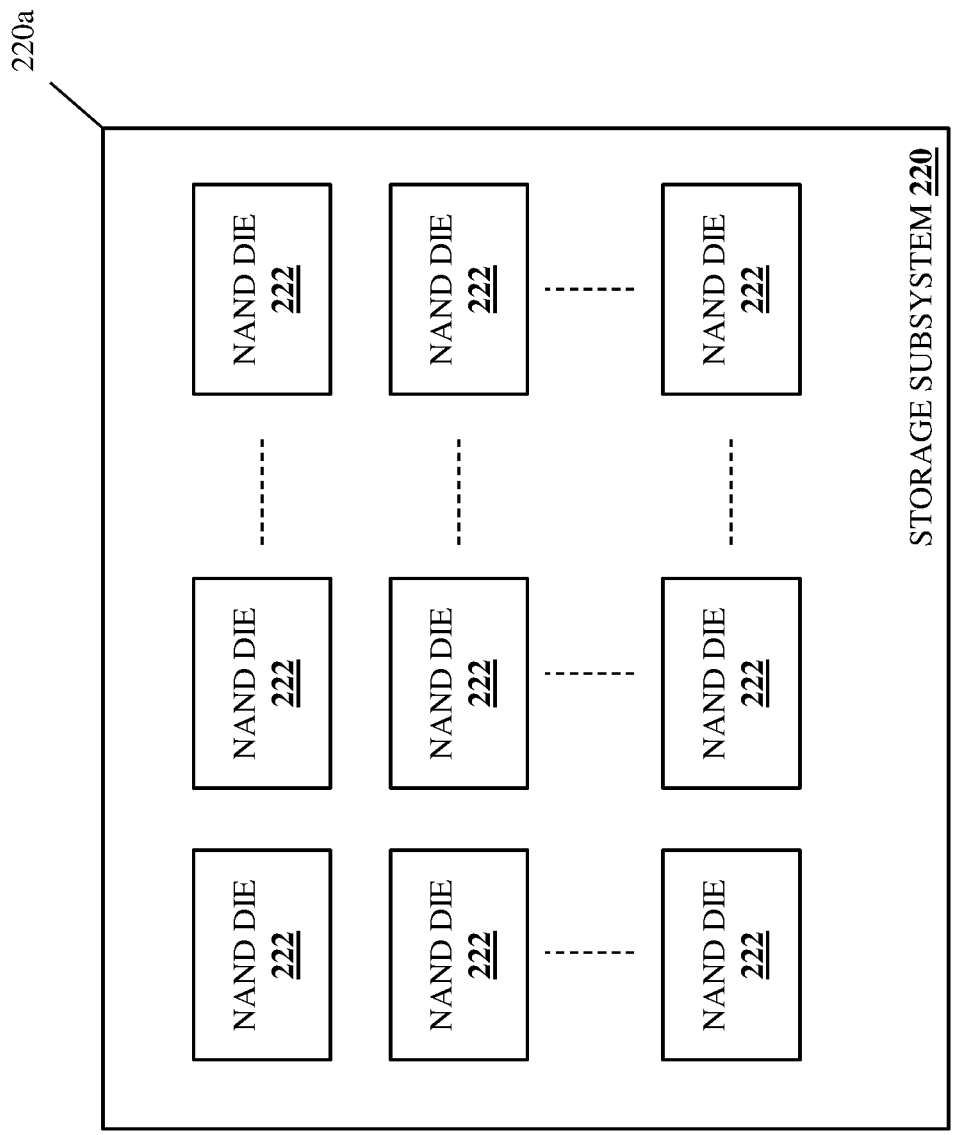
FIG. 2B is a schematic view illustrating an embodiment of a storage subsystem that may be included in the storage device of FIG. 2A.
Figure 2C:
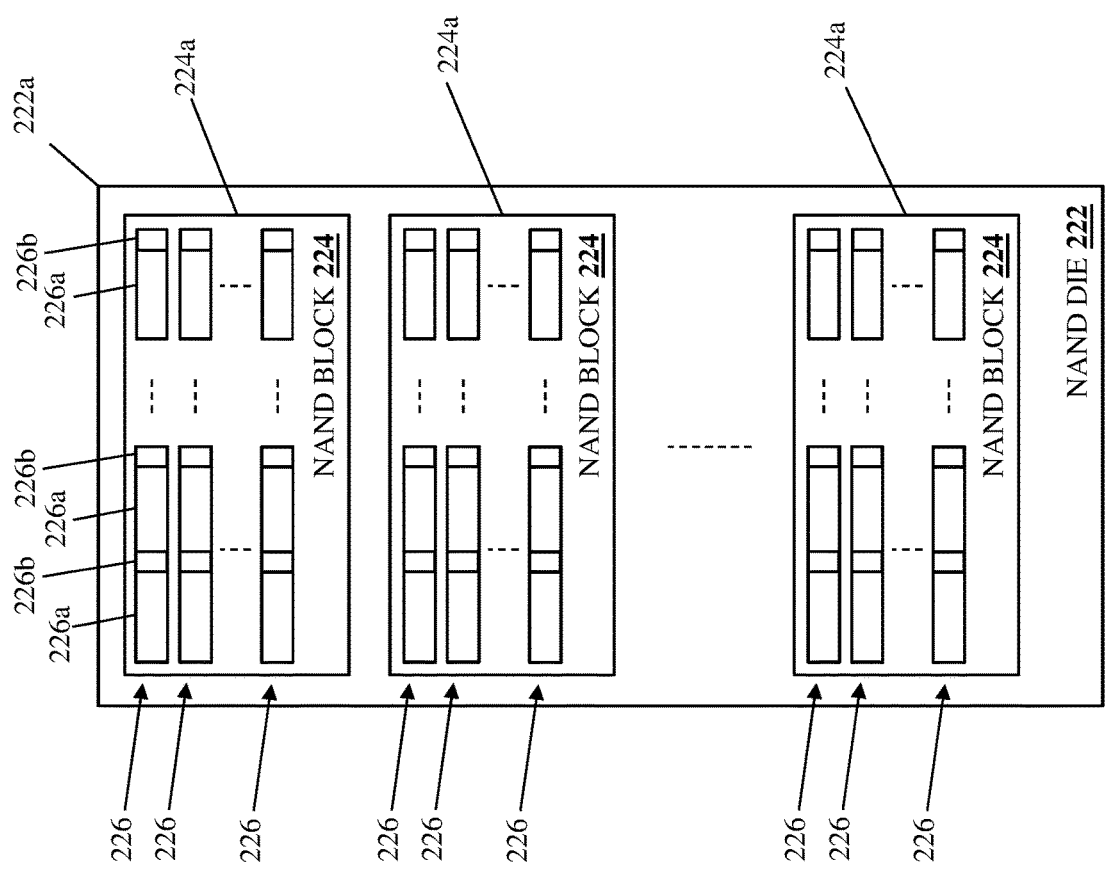
FIG. 2C is a schematic view illustrating an embodiment of a blocks in a die that may be included in the storage subsystem of FIG. 2B.

The storage device processing system 204 may also be coupled via a storage interface 218 to a storage subsystem 220. With reference to FIG. 2B, in some embodiments, the storage subsystem 220 may include a storage subsystem chassis 220a that supports a plurality of NAND die 222. With reference to FIG. 2C, each NAND die 222 may include a chassis 222a that supports a plurality of NAND blocks 224, with each NAND block 224 including a chassis 224a that supports a plurality of NAND wordlines 226. Furthermore, each NAND wordline 226 may include a plurality of cells that may be used to provide a plurality of data portions 226a, and respective error check portions 226b (e.g., Cyclic Redundancy Check (CRC) portions and/or other error check data known in the art) may be associated with each of those data portions 226a. However, one of skill in the art in possession of the present disclosure will appreciate how in some embodiments the data written to a NAND block 224 may include "padding" data or other data which conventionally does not require the writing of associated error check portions. Furthermore, as discussed below, the storage error identification data of the present disclosure may be written to the NAND block 224 without corresponding error check information as well.

To provide a specific example, the storage subsystem 220 may include 128, 256, or 512 NAND die, each NAND die may include approximately 2000 NAND blocks, with each NAND block including NAND wordlines grouped into 100-200 NAND layers (although forecasts predict that NAND wordlines will be grouped into up to 800 layers by the year 2030). As will be appreciated by one of skill in the art in possession of the present disclosure, conventional Triple Level Cell (TLC) technology typically allows on the order of tens to hundreds of K of data (e.g., 96 KiB on a NAND wordline, 48 KiB on a NAND wordline with two NAND wordlines activated at any particular time, up to hundreds of KiB when more planes are utilized, etc.) to be stored per NAND wordline (i.e., in the data portions of those NAND wordlines), resulting in NAND wordlines with ~250K cells.

As will be appreciated by one of skill in the art in possession of the present disclosure, the preparation of the user data discussed below for writing to a particular NAND row may include performing a plurality of data preparation operations such as Cyclic Redundancy Check (CRC) operations that provide a CRC code with that data that may later be used to detect the mis-correction of errors associated with that data, scrambling operations that may operate to randomize the data to minimize interference between values/cell voltages, Error Correction Code (ECC) operations that provide ECC with the data that allows for the correction of errors, and/or other data preparation operations that would be apparent to one of skill in the art in possession of the present disclosure. As such, user data may be written to a NAND block as encoded data with "redundancy" data and/or other encoded data error correction information known in the art, and a subsequent reading of that encoded data from the NAND row may include errors in that encoded data that may be corrected using that redundancy data and/or other encoded data error correction information.

As discussed above, errors can result when encoded data stored in NAND rows is read due to the physical design of the NAND device, physical effects that are often associated with aging of the NAND device (e.g., program/erase operations resulting in program/erase effects that increase as the NAND device ages), temporary effects such as data retention effects (e.g., charge leakage over time) in the NAND device, read disturb effects, program disturb effects, and/or other error introduction issues that would be apparent to one of skill in the art in possession of the present disclosure. As such, subsequent reads of encoded data may include the performance of a plurality of conventional data recovery operations such as ECC correction operations that utilize the ECC to correct errors associated with the encoded data, descrambling operations that operate to de-scramble the encoded data, CRC check operations that utilize the CRC code included in the encoded data to detect for the mis-correction of errors associated with the encoded data, and/or other data recovery operations that one of skill in the art in possession of the present disclosure would recognize as operating to reconstruct the originally written data so that the data may be accurately read from the NAND device. Thus, data read from a NAND block will typically have its errors conventionally corrected using redundancy data and/or other encoded data error correction information included with that data in order to allow for the reading of that data (or the faster reading of that data due to the reduced errors and/or fewer attempts needed to correctly read that data).

Figure 3A:
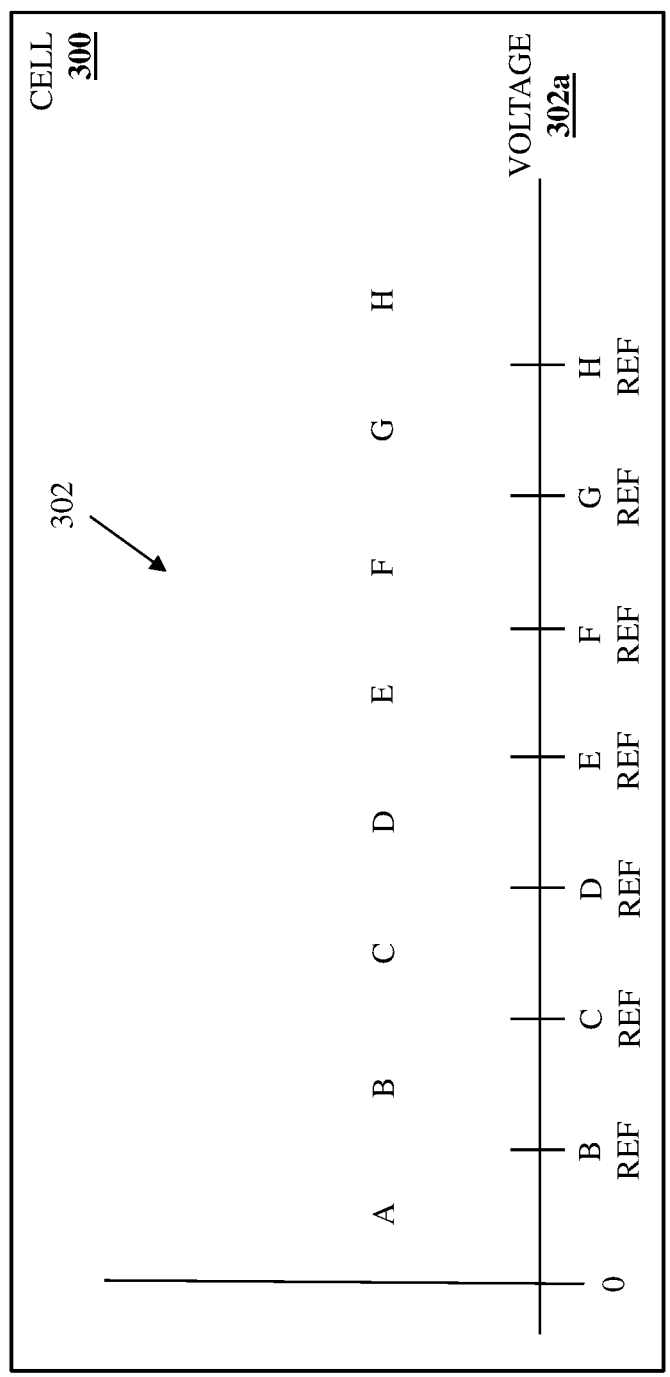
FIG. 3A is a graph view illustrating an embodiment of cell values available based on a voltage stored in cells included in blocks in the die of FIG. 2C.
Figure 3B:
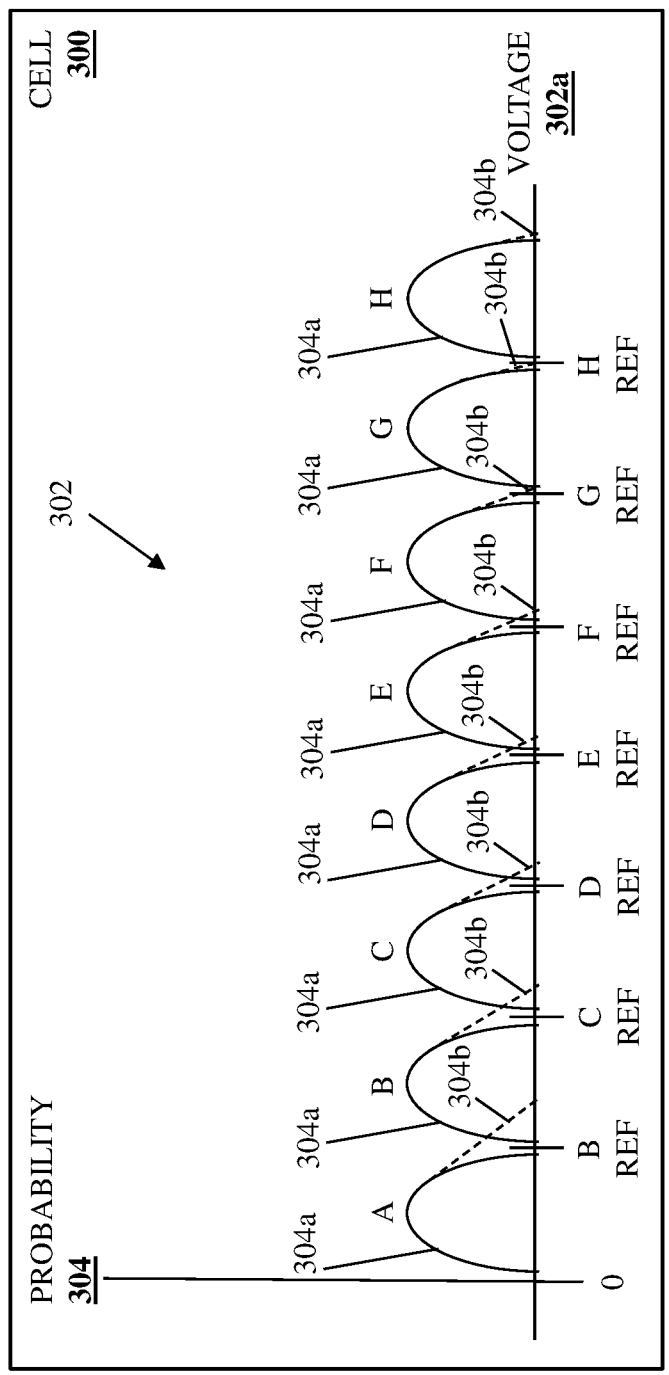
FIG. 3B is a graph view illustrating an embodiment of value/voltage distributions in cells included in blocks in the die of FIG. 2C, with temporary effects associated with a storage subsystem shifting those value-voltage distributions.

FIGS. 3A and 3B are provided below to discuss an example of how read disturb effects may produce the temporary effects discussed above that can result in errors when data is read from a cell that has experienced those read disturb effects. However, while a particular temporary effect is described, one of skill in the art in possession of the present disclosure will appreciate how other temporary effects (e.g., program disturb effects, retention time effects, etc.), physical effects (e.g., program/erase cycle effects) may produce errors in similar and/or different manners than described for the read disturb effects discussed below, and those effects may be identified via the teachings of the present disclosure while remaining within its scope as well.

With reference to FIG. 3A, a simplified representation of how data may be stored in a cell 300 is provided, and one of skill in the art in possession of the present disclosure will appreciate how data may be stored in any of the plurality of cells in any of the plurality of NAND wordlines discussed above in the manner described below. The data storage representation of the cell 300 in FIG. 3A includes a graph 302 with voltage 302a on the X-axis, and illustrates how different voltages of the cell 300 may be associated with different values for that cell 300, which in specific example illustrated in FIG. 3A includes values "A", "B", "C", "D", "E", "F", "G", and "H". Furthermore, the data storage representation of the cell 300 also illustrated how reference voltages may be defined to distinguish whether a voltage in the cell provide a particular value, with a B reference ("B REF") distinguishing between a value "A" or a value "B" for the cell 300, a C reference ("C REF") distinguishing between a value "B" or a value "C" for the cell 300, a D reference ("D REF") distinguishing between a value "C" or a value "D" for the cell 300, an E reference ("E REF") distinguishing between a value "D" or a value "E" for the cell 300, an F reference ("F REF") distinguishing between a value "E" or a value "F" for the cell 300, a G reference ("G REF") distinguishing between a value "F" or a value "G" for the cell 300, an H reference ("H REF") distinguishing between a value "G" or a value "H" for the cell 300.

As such, when the cell 300 includes a voltage below "B REF" it will provide a value "A", when the cell 300 includes a voltage between "B REF" and "C REF" it will provide a value "B", when the cell 300 includes a voltage between "C REF" and "D REF" it will provide a value "C", when the cell 300 includes a voltage between "D REF" and "E REF" it will provide a value "D", when the cell 300 includes a voltage between "E REF" and "F REF" it will provide a value "E", when the cell 300 includes a voltage between "F REF" and "G REF" it will provide a value "F", when the cell 300 includes a voltage between "G REF" and "H REF" it will provide a value "G", when the cell 300 includes a voltage over "H REF" it will provide a value "H". While not illustrated or described in detail herein, one of skill in the art in possession of the present disclosure will appreciate that each value A-H illustrated in FIG. 3A may be configured to store more than one bit depending on the amount of voltage that is provided to indicate that value (e.g., a first voltage level between "B REF" and "C REF" will provide a first set of bits for the value "B", a second voltage level between "B REF" and "C REF" will provide a second set of bits for the value "B", and so on).

With reference to FIG. 3B, the simplified representation from FIG. 3A of how data may be stored in a cell 302 is reproduced, but with the data storage representation of the cell 300 in FIG. 3B including the graph 302 with voltage 302a on the X-axis and probability 304 on the Y-axis. The graph 302 in FIG. 3B also includes voltage/value probabilities 304a (provided in solid lines) for each value "A"-"H" available in the cell 300 that, as can be seen, is highest in the middle of the voltage range for each value "A"-"H", and reduces to near-zero near the bounds of the voltage range for each value "A"-"H" (e.g., the voltage/value probability for the value "A" is highest midway between "0" and "B REF" and reduces to near-zero at both "0" and "B REF", the voltage/value probability for the value "B" is highest midway between "B REF" and "C REF" and reduces to near-zero at both "B REF" and "C REF", and so on).

As will be appreciated by one of skill in the art in possession of the present disclosure, FIG. 3B illustrates how the cell 300 may experience read disturb effect when data is read from adjacent storage locations and the voltages utilized to perform such reads operate to "micro-program" the cell 300. As such, the graph 302 includes a read disturb effect skew 304b (provided in dashed lines) that illustrates how the micro-programming resulting from the read disturb effect skews the voltage/value probabilities 304a for each value "A"-"H" available in the cell 302. For example, a plurality of reads at a particular storage location in a NAND block will cause the accumulation of charge/voltage in adjacent storage locations in that NAND block, and a desired value in some cells in those adjacent storage locations may then be mistakenly read as a different value due to the voltage in those cells increasing (i.e., due to the micro-programming discussed above) such that they cross the reference voltage that defines that different value.

The specific example in FIG. 3B illustrates how the accumulation of charge in the cell 300 may introduce the read disturb effect skew 304b for one or more of the values "A"-"H" that can cause at least a portion of the voltage/value probabilities 304a for those values to shift across the reference voltage for an adjacent value. As can be seen in FIG. 3B, the read disturb effect skew 304b to the voltage/value probability 304a for the value "A" causes that voltage/value probability 304a to skew past the B REF, and thus some reads of voltages in the cell 300 that are desired to provide the value "A" will instead mistakenly provide the value "B" (i.e., due to the actual voltage read being between the B REF and the C REF because it was "pushed" in that "direction" due to the micro-programming resulting from the read disturb effect). Similarly, bits "111" represented by a value "A" may be read as bits "110" represented by a value "B" (i.e., a bit may "flip"). Furthermore, while a single example is provided, one of skill in the art in possession of the present disclosure will appreciate how the read disturb effect skew 304b to the voltage/value probability 304a for any of the values "B"-"H" can result in the identification of a mistaken value in a similar manner.

As noted above, while the discussion above illustrates how a particular temporary effect (i.e., the read disturb effect) can result in errors when data is read (by reading that data as a different value and/or one or more flipped bits that are represented by a value), one of skill in the art in possession of the present disclosure will appreciate how other temporary effects (e.g., program disturb effects, retention time effects, etc.) will result in similar errors when data is read. As also discussed above, similar errors can result due to physical effects such as program/erase cycle effects as the storage device 200 ages. As such, the "movement" or rewriting of data (i.e., the writing of a copy of data to a new storage location) can operates to "reset" the temporary effects that result in errors when data is read, but cannot address physical effects that result in errors when data is read.

Thus, a variety of different physical and temporary effects can introduce errors that result when data is read from a storage subsystem, and conventional storage devices operate to identify those errors during the reading of data when data reads are requested by a host system (e.g., the computing device in which that storage device is located), and then subsequently react to those errors. As such, conventional storage devices tend to spend time guessing and performing different techniques to reduce errors resulting from a read of data, which slows down the storage device and delays the return of data that has been requested by the host system when the number of errors associated with a data read is relatively high.

Referring now to FIG. 4, an embodiment of a method 400 for storage error identification and reduction is illustrated. As discussed below, the systems and methods of the present disclosure provide for the injection of storage error identification data with a known pattern within user data that is written to a block, and then subsequently read and analyze errors in that storage error identification data based on its known pattern in order to determine error reduction operations to perform before reading the user data. For example, the storage error identification/reduction system of the present disclosure includes a storage subsystem including a block, and a storage error identification/reduction subsystem coupled to the storage subsystem. The storage error identification/reduction subsystem receives first data, and writes the first data to first storage locations in the block while writing storage error identification data to second storage location(s) in the block that each are located adjacent to at least one of the first storage locations, with the storage error identification data including predetermined values that are written to predetermined locations included in the second storage location(s) in the block. The storage error identification/reduction subsystem then reads the storage error identification data from the second storage location(s) and, based on the predetermined values and predetermined locations of the storage error identification data, identifies errors resulting from the reading of the storage error identification data. Based on the errors, the storage error identification/reduction subsystem determines and performs error reduction operation(s). As such, the systems and methods of the present disclosure operate to reduce, and in some cases minimize, the number of errors that will result when the user data is read, and may also be utilized to monitor and maintain the health of a storage device even when user data is not currently being read.

Figure 5:
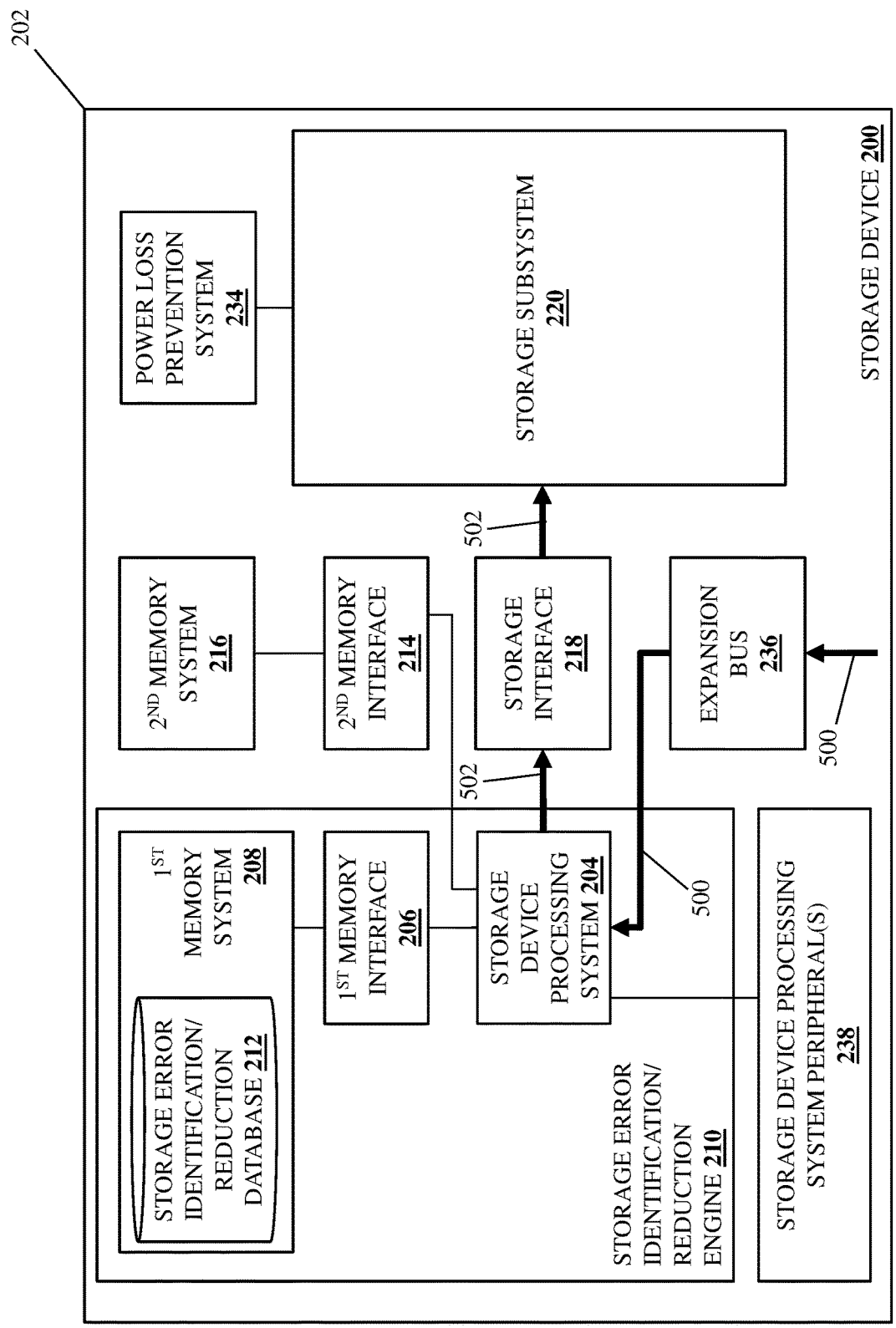
FIG. 5 is a schematic view illustrating an embodiment of the storage device of FIG. 2A operating during the method of FIG. 4.

The method 400 begins at block 402 where a storage device receives user data. With reference to FIG. 5, in an embodiment of block 402, the storage error identification/reduction engine 210 may perform user data receiving operations 500 that include receiving user data at the storage device processing system 204 via the expansion bus 236. As discussed above, the storage device 200 may be provided in a computing device, and a host system (e.g., an operating system in the computing device, an application in the computing device, etc.) may transmit a write request including the user data to the storage device processing system 204 via the expansion bus 236. For example, a user utilizing an application in the computing device may perform a "save" operation via that application that generates and provides the user data to the storage device 200 for storage. However, while a specific example is described, one of skill in the art in possession of the present disclosure will appreciate how user data may be provided to the storage device 200 in a variety of manners that will fall within the scope of the present disclosure as well.

The method 400 then proceeds to block 404 where the storage device writes the user data to a block while injecting storage error identification data within the user data in the block. With continued reference to FIG. 5, in an embodiment of block 404, the storage error identification/reduction engine 210 may perform user data write/storage error identification data injection operations 502 that include the storage device processing system 204 writing, via the storage interface 218 in the storage subsystem 220, the user data received at block 402 while injecting storage error identification data within that user data.

Figure 6:
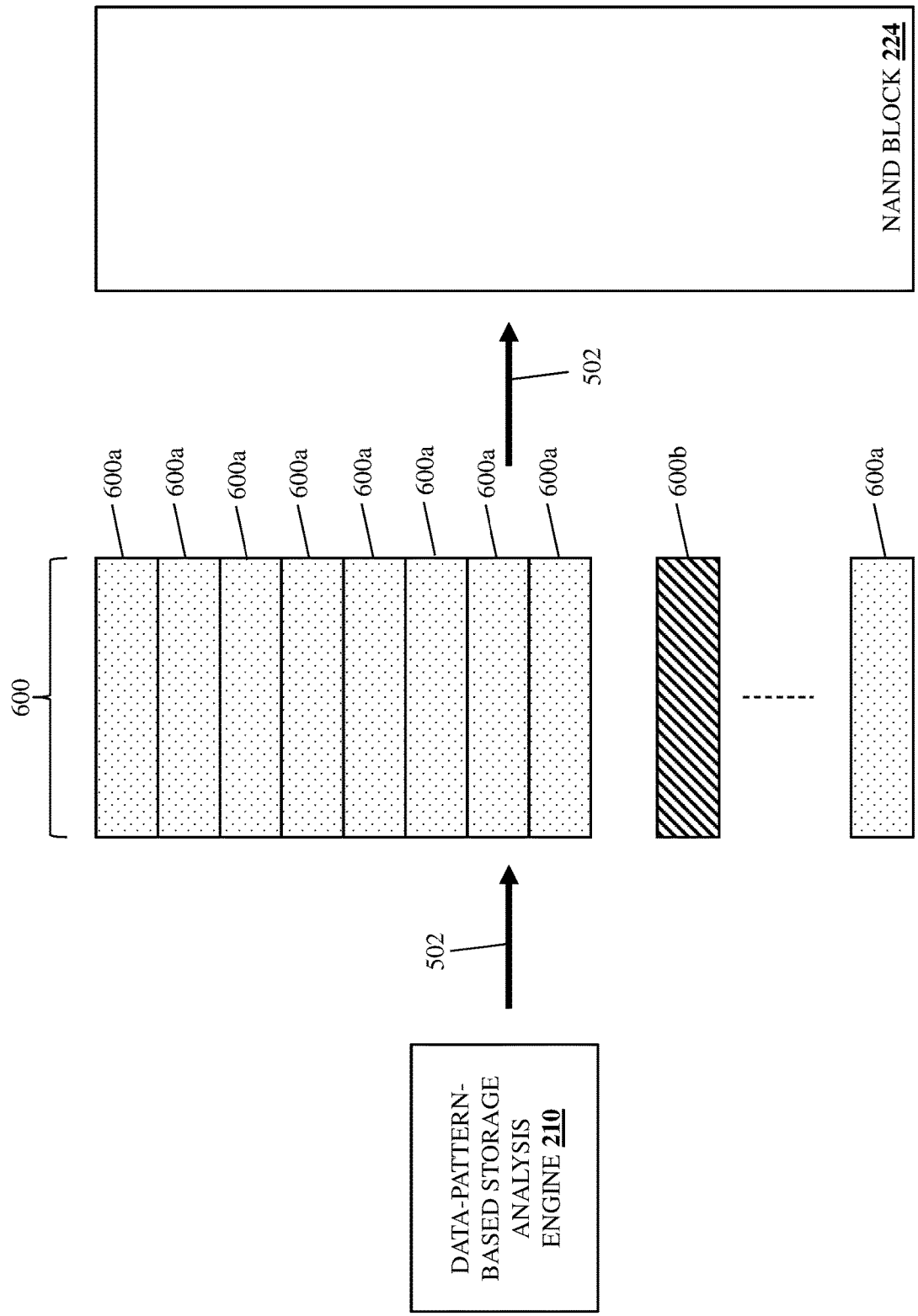
FIG. 6 is a schematic view illustrating an embodiment of the writing of user data and the injection of storage error identification to a block in a storage subsystem.

With reference to FIG. 6, an embodiment of a user data/storage error identification data write stream 600 is illustrated that one of skill in the art in possession of the present disclosure will recognize operates to provide the user data received at block 402 in user data write groups 600a that correspond to data storage groups in a NAND block 224 in the storage subsystem 220, discussed in further detail below, with the user data write groups 600a identified herein via a dot pattern. For example, each of the user data write groups 600a may include a respective portion of the user data received at block 402 that has been processed as discussed above such that it has been randomized and includes CRC code and ECC. In a specific example, the NAND block 224 may include 4 KB data storage groups, and thus each of the user data write groups 600a may be less than or equal to 4 KB in size.

One of skill in the art in possession of the present disclosure will also recognize how the user data/storage error identification data write stream 600 also provides storage error identification data in a storage error identification data injection group 600b that is injected in the user data write groups 600a, with the storage error identification data injection groups 600b identified herein via a diagonal striped pattern. As such, the user data/storage error identification data write stream 600 includes some number of user data write groups 600a that include the user data, followed by a storage error identification data injection group 600b that includes the storage error identification data, followed by some number of user data write groups 600a that include the user data, followed by a storage error identification data injection group 600b that includes the storage error identification data, and so on until all of the user data received at block 402 is written to one or more NAND blocks 224 in the storage subsystem 220.

Figure 7A:
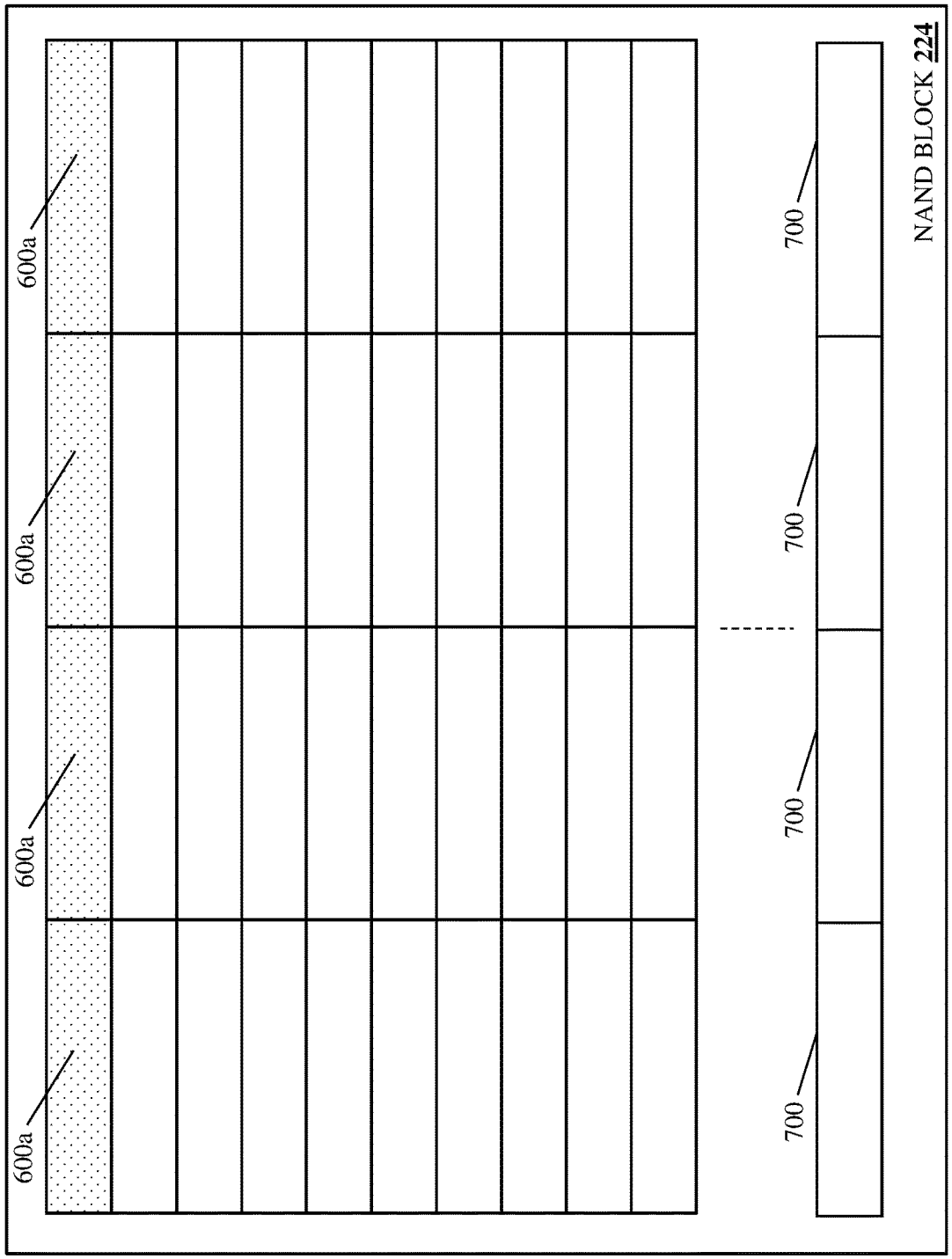
FIG. 7A is a schematic view illustrating an embodiment of the writing of user data to a block in a storage subsystem.
Figure 7B:
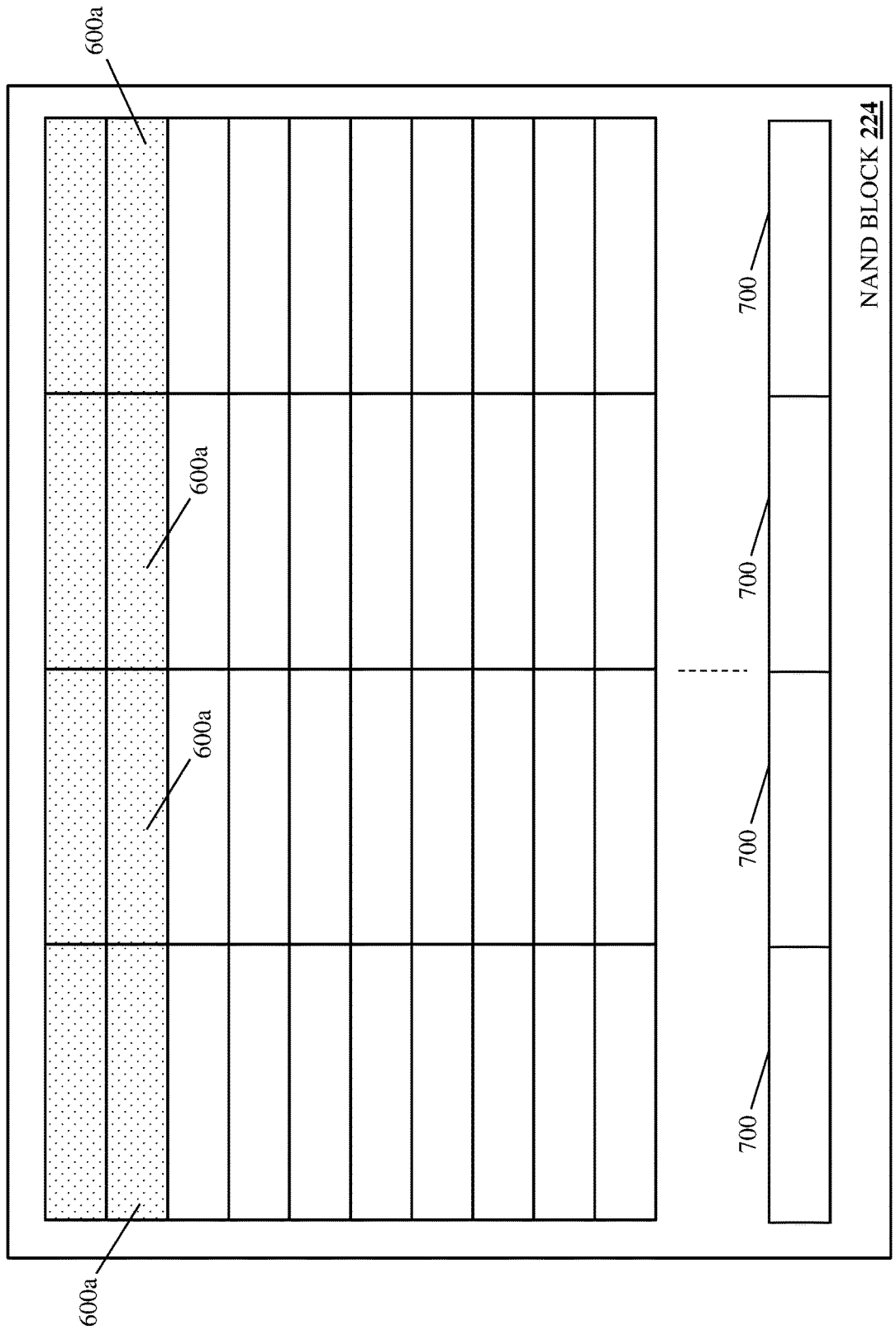
FIG. 7B is a schematic view illustrating an embodiment of the writing more user data to the block in the storage subsystem of FIG. 7A.

As illustrated in FIG. 7A, the user data write/storage error identification data injection operations 502 using the user data/storage error identification data write stream 600 may operate to write of a first subset of user data write groups 600a (four user data write groups 600a in the first/top row in the example illustrated in FIG. 7A) to corresponding data storage groups 700 in the NAND block 224, and one of skill in the art in possession of the present disclosure will appreciate how user data write groups 600a may be written to the data storage groups 700 from left-to-right in the example illustrated in FIG. 7A. As illustrated in FIG. 7B, the user data write/storage error identification data injection operations 502 using the user data/storage error identification data write stream 600 may continue by writing a second subset of user data write groups 600a (four user data write groups 600a in the second row in the example illustrated in FIG. 7B) to corresponding data storage groups 700 in the NAND block 224, and one of skill in the art in possession of the present disclosure will appreciate how user data write groups 600a may be written to the data storage groups 700 from left-to-right in the example illustrated in FIG. 7B.

Figure 7C:
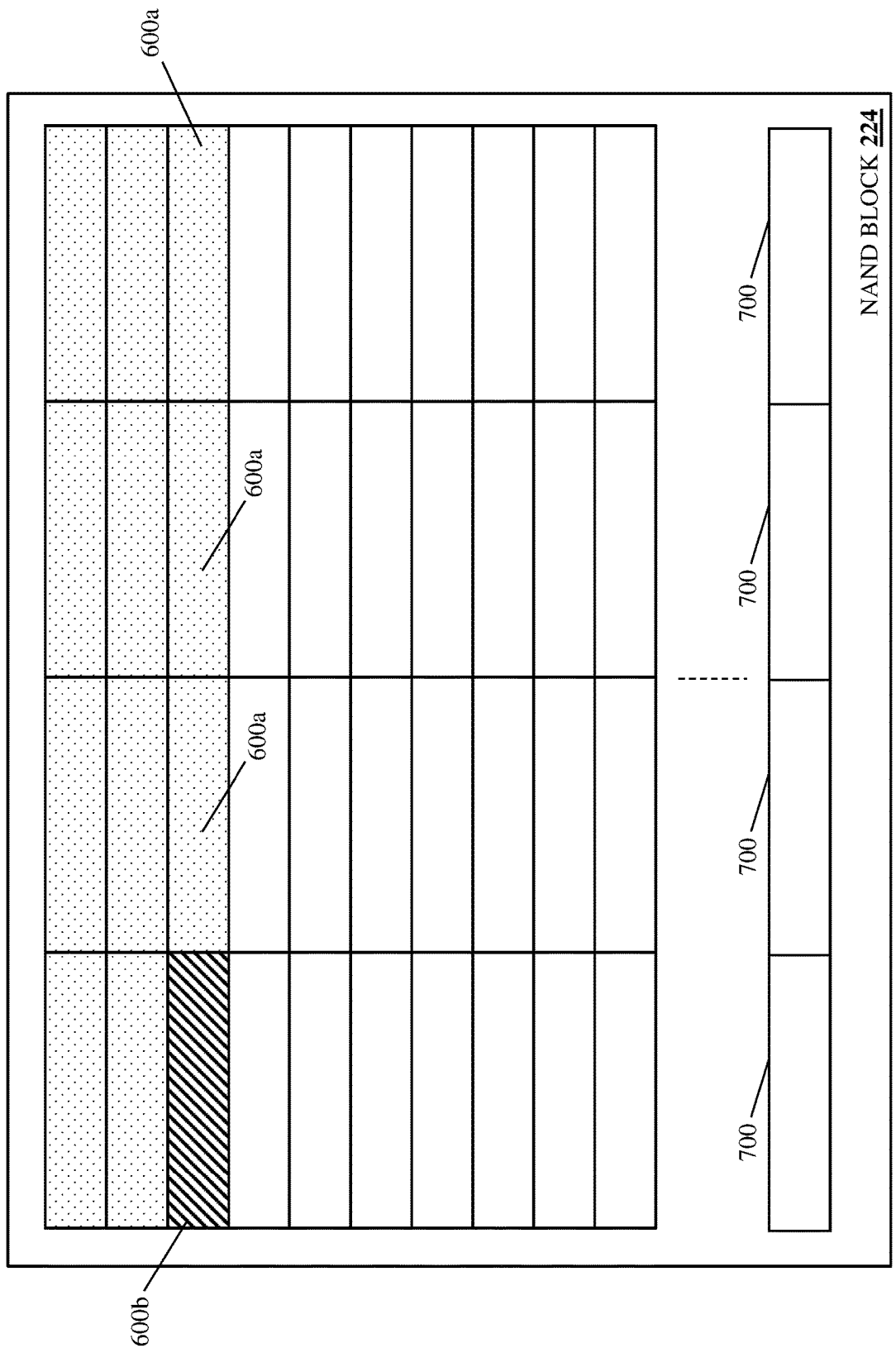
FIG. 7C is a schematic view illustrating an embodiment of the writing storage error identification data and more user data to the block in the storage subsystem of FIG. 7B.
Figure 7D:
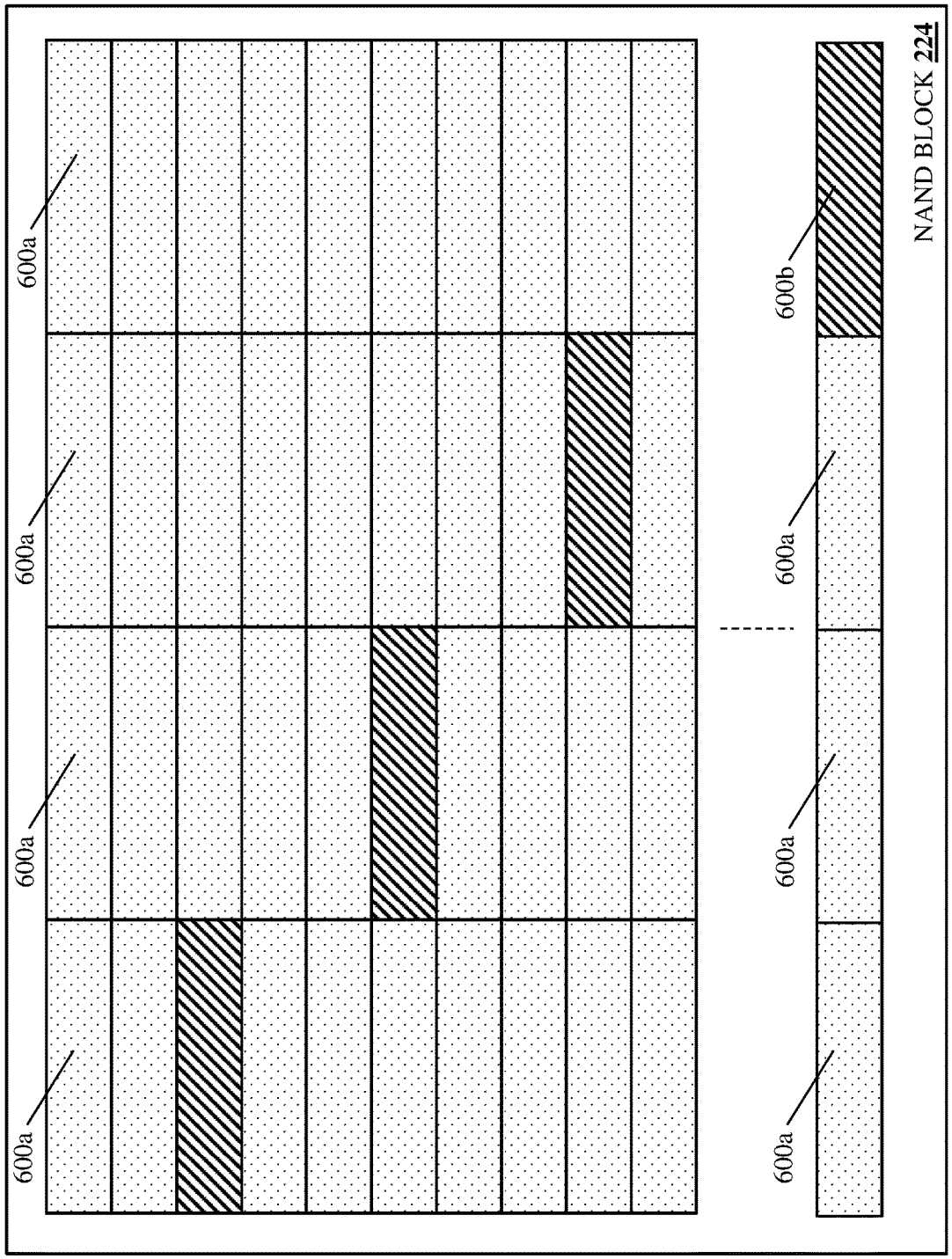
FIG. 7D is a schematic view illustrating an embodiment of the writing of more storage error identification data and more user data to the block in the storage subsystem of FIG. 7C.

As illustrated in FIG. 7C, the user data write/storage error identification data injection operations 502 using the user data/storage error identification data write stream 600 may continue by writing a storage error identification data injection group 600b and a third subset of user data write groups 600a (a single storage error identification data injection group 600b and three user data write groups 600a in the third row in the example illustrated in FIG. 7C) to corresponding data storage groups 700 in the NAND block 224, and one of skill in the art in possession of the present disclosure will appreciate how the storage error identification data injection group 600b and user data write groups 600a may be written to the data storage groups 700 from left-to-right in the example illustrated in FIG. 7C. As illustrated in FIG. 7D, the user data write/storage error identification data injection operations 502 using the user data/storage error identification data write stream 600 may be completed for the NAND block 224 by writing user data write groups 600a and injecting storage error identification data injection groups 600b within those user data write groups 600a throughout the NAND block 224. As discussed herein, the known patterns of data included in the storage error identification data injection groups may differ across different storage error identification data injection groups.

However, while FIG. 7D illustrates how a specific user data/storage error identification data write stream 600 may result in a specific distribution of user data write groups 600a and storage error identification data injection groups 600b within a NAND block 224, one of skill in the art in possession of the present disclosure will appreciate how user data/storage error identification data write streams may be configured to provide any of a variety of distributions of user data write groups 600a and storage error identification data injection groups 600b within a NAND block 224 while remaining within the scope of the present disclosure as well. For example, one of skill in the art in possession of the present disclosure will appreciate how the storage error identification data may be injected into the NAND block 224/storage subsystem 220 at particular storage locations to identify errors that will result from reads of storage locations that are known/expected to be experiencing the physical effects or temporary effects discussed above. As such, a variety of analysis on the NAND block 224 may be conducted and used to determine the particular data storage groups 700 in the NAND block 224 at which the storage error identification data injection group 600b will be written.

As discussed in further detail below, storage error identification data provided in the storage error identification data injection groups 600b in the NAND block 224 includes one or more known/predetermined patterns of data. For example, the storage error identification data of the present disclosure may provide for the writing of particular values/bits to the groups of cells in the data storage groups 700 in the NAND block 224 to which it is written (e.g., for a particular storage location, a known/predetermined sequence of "0's" and "1's" may be written to that storage location). For example, with reference to FIG. 7D, the writing of the storage error identification data injection groups 600b to the data storage groups 700 in the NAND block 224 may provide for the writing of a value "A" to a first cell, the writing of a value "B" to a second cell, and so on such that the writing of the storage error identification data injection groups 600b provides predetermined/known values are written at predetermined known locations in subset of the data storage groups 700 in the NAND block 224 that include the storage error identification data. As such, any particular storage error identification data injection group 600b written to a data storage group 700 in the NAND block 224 will include predetermined values at predetermined locations. Furthermore, different known patterns of storage error identification data may be utilized within a block or across blocks, and across different writes of the storage error identification data over time.

In a specific example, a storage error identification data equation that may be utilized by the storage error identification/reduction engine 210 during the data write/storage error identification data injection operations 502 to generate the storage error identification data that is injected within the user data via the storage error identification data injection groups 600b. As such, one of skill in the art in possession of the present disclosure will appreciate how the storage error identification data equation may be configured to generate the particular values for writing to particular locations (e.g., by generating a value "A" for writing to a first cell, generating a value "B" for writing to a second cell, and so on) so that errors in the storage error identification data may be identified as discussed in further detail below.

Furthermore, in some embodiments, the storage error identification data equation may be configured to generate the storage error identification data in a manner that satisfies data diversity requirements of the storage subsystem 220. As will be appreciated by one of skill in the art in possession of the present disclosure, NAND storage subsystems require data written thereto to satisfy data diversity requirements (e.g., by providing a random or pseudorandom distribution of "0's" and "1's"), and conventional storage devices perform the scrambling operations discussed above in an attempt to ensure those data diversity requirements are met when writing user data to the storage subsystem 220. However, the known patterns provided by the storage error identification data will be lost if subject to conventional scrambling operations, and one of skill in the art in possession of the present disclosure will appreciate how the storage error identification data equation may be configured to generate the storage error identification data in a manner that meets any data diversity requirements of the storage subsystem 220. As will be appreciated by one of skill in the art in possession of the present disclosure, the use of a storage error identification data equation to generate the storage error identification data in a manner that is predetermined to satisfy data diversity requirements of the NAND storage subsystem operates to eliminate issues associated with conventional hardware-based scrambling of data in conventional storage devices discussed above (e.g., when a conventional hardware scrambling pattern closely matches the data being scrambled in a manner that produces repeating/"non-random" patterns that can be detrimental to data retention). As such, data randomization sufficiency assumptions that are required when writing data in conventional storage subsystems are eliminated for the storage error identification data.

As will be appreciated by one of skill in the art in possession of the present disclosure, the writing of the storage error identification data injection groups 600b to the data storage groups 700 in the NAND block 224 is performed without generating or writing of any error correction information for the storage error identification data. As discussed in further detail below, the known/predetermined pattern of the storage error identification data allows any errors that result from the reading of the storage error identification data to be directly determined without the need for error correction information that, as discussed above, is conventionally provided along with data written to storage subsystems. As such, additional storage space that would typically be required when writing data to the storage subsystem is freed up when writing the storage error identification data to the storage subsystem.

As such, following block 404, the NAND block 224 in the storage subsystem 220 may be filled with the user data received at block 402, as well as storage error identification data that has known/predetermined patterns and that has been injected throughout the user data at predetermined/known locations. Furthermore, one of skill in the art in possession of the present disclosure will recognize how multiple NAND blocks 224 in the storage subsystem may be filled with user data/storage error identification data in a similar manner as described above in order to write all the user data received at block 402 to the storage subsystem 220, as well as to write any other user data to the storage subsystem 220 as well. As will be appreciated by one of skill in the art in possession of the present disclosure, the storage error identification data with the known/predetermined patterns that is stored at the predetermined/known locations in the NAND block 224 will be subject to the same (or similar) physical and temporary effects as the user data in adjacent storage locations in the NAND block 224, and therefore will be affected in similar ways.

Furthermore, in some embodiments, the storage error identification data of the present disclosure may utilize a known pattern that may be generated based on a characterization of the storage media (e.g., the NVMe storage device in the example above, other storage devices known in the art) that takes into account physical (or other) characteristics of that storage media, based on a location in the storage media at which the user data will be written and which may be characterized as "weaker" or otherwise more susceptible to error issues than other locations in the storage media, and/or based on other factors that would be apparent to one of skill in the art in possession of the present disclosure. Furthermore, the storage error identification data of the present disclosure may be placed in the block and within the user data at locations that are based on the storage media characterization/identified storage media error susceptibility discussed above. Further still, the storage error identification data of the present disclosure may include a known pattern that assists the storage transformation operations discussed below in detecting and reducing errors in the storage subsystem.

Figure 8:
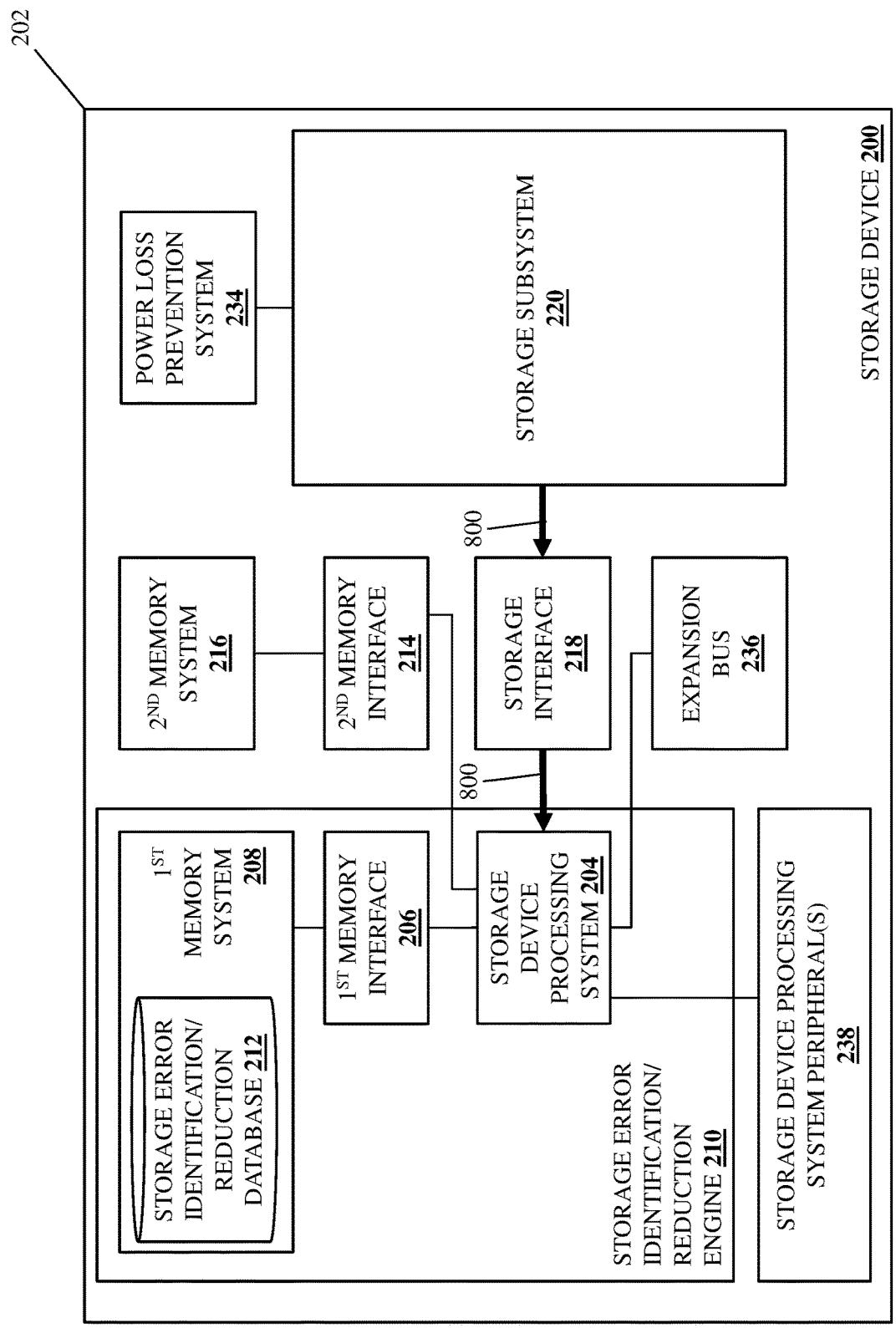
FIG. 8 is a schematic illustrating an embodiment of the storage device of FIG. 2A operating during the method of FIG. 4

The method 400 then proceeds to block 406 where the storage device reads the storage error identification data from the block. With reference to FIG. 8, in an embodiment of block 406, the storage error identification/reduction engine 210 may perform storage error identification read operations 800 that include the storage device processing system 204 reading, via the storage interface 218 in the storage subsystem 220, the storage error identification data written at block 404. In some embodiments, the storage error identification read operations 800 may be performed prior to reading user data from the storage subsystem 220, with the storage error identification data used to determine error reduction operations to perform before reading that user data. In other embodiments, the storage error identification read operations 800 may be performed subsequent to the reading of user data from the storage subsystem 220 that resulted in some threshold number of errors (e.g., an uncorrectable error situation, a corrected error situation where the errors are relatively high, etc.), with the storage error identification data used to determine error reduction operations to perform before reading that user data again.

In yet other embodiments, the storage error identification read operations 800 may be performed without the need for any corresponding read of user data from the storage subsystem 220, and with the storage error identification data used to determine error reduction operations to improve the general health/characteristics of the storage subsystem 220. Furthermore, the storage error identification read operations 800 may be performed to determine whether corresponding/adjacent user data should be moved due to error effects on storage error identification data exceeding error thresholds. For example, in response to an uncorrectable error situation associated with user data, corresponding/adjacent storage error identification data may be used to determine the cause of the uncorrectable error situation. Similarly, storage error identification data may simply be logged for analysis in a subsequent product-return or debug process (e.g., if a user reports an increase in error metrics and returns a debug file from the storage device, portions of the storage error identification data from failed blocks may be included in that debug file and processed to determine the cause of the increased in error metrics). However, while several different situations are described in which the storage error identification data may be read, one of skill in the art in possession of the present disclosure will appreciate how the storage error identification data may be read in other situations in order to determine and perform error reduction operation(s) while remaining within the scope of the present disclosure as well.

In some examples, the reading of storage error identification data from any particular NAND block 224 may include reading the storage error identification data from each of the data storage groups 700 in that NAND block 224 in which that storage error identification data was written. However, in other examples, the reading of storage error identification data from any particular NAND block 224 may include reading the storage error identification data from a subset of the data storage groups 700 in that NAND block 224 in which that storage error identification data was written. For example, a subset of data storage groups 700 in a NAND block 224 that store storage error identification data may be selected in order to identify error reduction operations to perform before reading particular user data stored in a subset of the data storage groups 700 in that NAND block 224 (i.e., for particular user data stored in corresponding data storage groups 700, adjacent data storage group(s) 700 that store storage error identification data may be selected for reading in order to determine error reduction operations to perform before reading that particular user data). Furthermore, one of skill in the art in possession of the present disclosure will appreciate how storage error identification data may be read across NAND blocks 224 (e.g., as part of managing the health of the storage subsystem 220, in preparation to read user data in those NAND blocks 224, etc.)

The method 400 then proceeds to block 408 where the storage device identifies errors resulting from the reading of the storage error identification data. In an embodiment, at block 408, the storage error identification/reduction engine 210 may perform storage error identification operations that include the storage device processing system 204 identifying errors that result from the reading of the storage error identification data by comparing the storage error identification data that was read from the storage subsystem at block 406 to the known/predetermined pattern of the storage error identification data that was written to the storage subsystem 220 at block 404. For example, for any of the storage error identification data read at block 406, the storage error identification operations may include using the storage error identification data equation discussed above to generate the known/predetermined pattern of that storage error identification data, and then comparing that known/predetermined pattern of the storage error identification data to the storage error identification data that was read at block 406.

As such, continuing with the example above, if the known/predetermined pattern of the storage error identification data includes a value "A" that was written in a first cell at block 404, and the storage error identification data read from the first cell at block 406 is a value "B", an error may be identified. Similarly, if the known/predetermined pattern of the storage error identification data includes bits "111" that were written in a first cell at block 404, and the storage error identification data red from the first cell at block 406 includes "110", an error may be identified (e.g., a "flipped" third bit may be identified). As such, one of skill in the art in possession of the present disclosure will appreciate how the storage error identification operations are capable of identifying the exact locations of errors that have occurred on a value/bit level. To provide a specific example using the read disturb effect errors described above, the value error (i.e., an expected value of "A" was read as "B") or flipped bit error (i.e., an expected value of "111" was read as "110") may be identified for particular cells in particular NAND blocks 224 in the storage subsystem 220. As such, one of skill in the art in possession of the present disclosure will appreciate how the storage error identification operations will result in the identification of the exact locations (i.e., cell location within the NAND block 224) of each of the errors that occurred when reading the storage error identification data at block 406.

The method 400 then proceeds to block 410 where the storage device determines error reduction operation(s) based on the errors. In an embodiment, at block 410, the storage error identification/reduction engine 210 may perform error reduction determination operations that include the storage device processing system 204 using the errors identified at block 408 to determine one or more error reduction operations. As will be appreciated by one of skill in the art in possession of the present disclosure, the granular knowledge of the exact locations and nature of errors that resulted from the reading of the storage error identification data in the data storage locations 700 of the NAND block 224 (e.g., how data has switched values such as, for example, from the value "A" to the value "B", or from the value "B" to the value "A") may be analyzed to determine the origin or cause of those errors, which as discussed above may be due to any of the physical effects or temporary effect described above. Furthermore, the conditions that produced the errors that resulted from the reading of the storage error identification data in the data storage locations 700 of the NAND block 224 may be assumed to exist in the adjacent data storage locations 700 that store the user data, and thus error reduction operations may be determined that are configured to reduce those errors on a subsequent read.

As will be appreciated by one of skill in the art in possession of the present disclosure, insights into the physical and/or temporary effects that are present/dominant in the storage subsystem 220 can be utilized by storage subsystem health management operations that operate to manage the storage subsystem 220 to ensure its optimal operation (e.g., by predetermining read shift value adjustments (or other storage transformation operations, discussed below) for any data in an error-affected area in the storage subsystem, and then using those predetermining read shift value adjustments (or other storage transformation operations) when that data is read), as well as generate error reduction operations that include storage transformation operations that may be performed to reduce errors (misread values, flipped bits, etc.) that result from the reading of data from the storage subsystem 220. In some embodiments, storage transformation operations may be identified that minimize errors (misread values, flipped bits, etc.) that result from the reading of data from the storage subsystem 220. For example, based on errors detected using the storage error identification data as described herein, a mathematical data transformation may be generated that is configured to reduce those errors, and that mathematical data transformation (e.g., filters, position-dependent data manipulations, etc.) may then be utilized in data transformation operations performed on data that has been read in order to transform that data to a state that has reduced errors.

As will be appreciated by one of skill in the art in possession of the present disclosure, the error reduction options determined at block 410 will tend to be based on the type of errors identified. For example, errors based on the read disturb effect and data retention times are typically expected to be temporary, and may be corrected by erasing the block associated with the errors after writing the data in that block to a new storage location. In another example, physical/location-based errors may occur in "weak" cells where data read shortly after writing is either degraded beyond what is expected (over a threshold number of flipped bits after a relatively short time period), or in damaged cells where some structure within the storage subsystem is shorted. The systems and methods of the present disclosure may, in response to identifying a threshold number of errors (e.g., more than a threshold number of value changes/flipped bits), determine a read shift value that reduces the number of errors as described herein, and then may re-perform the read operations to determine whether the number of errors is reduced (with iterations performed to identify the "best" shift to perform reads with).

For example, continuing with the example of a storage subsystem experiencing the temporary read disturb effects discussed above, the errors identified at block 408 may allow for the identification of particular locations in the NAND block 224 where values are misread or bits have flipped, and thus the error reduction operations determined at block 410 may include the shifting of value voltage reference levels (e.g., the shifting of "B REF" in FIG. 3A towards "C REF" and away from "0") in a manner that results in the value being read correctly or the bit not flipping. As will be appreciated by one of skill in the art in possession of the present disclosure, the knowledge of the exact locations of errors in the storage error identification data allow not only the types of error reduction operations to be determined (e.g., value voltage reference level shifts), but also the locations in the storage subsystem at which those error reduction operations should be performed (e.g., storage locations that are within the same block as the storage location that experienced the misread value or flipped bit in the storage error identification data, and thus are likely to be experiencing the same effects).

However, while a particular value voltage reference level shift/error reduction operation to reduce errors associated with read disturb effects has been described, one of skill in the art in possession of the present disclosure will appreciate how other error reduction operations (e.g., mathematical operations, signal processing operations, artificial intelligence operations) for other temporary effects (program disturb effects, retention time effects, etc.) and physical effects (program/erase cycle effects) may be determined at block 410 while remaining within the scope of the present disclosure as well. Furthermore, one of skill in the art in possession of the present disclosure will recognize how the storage error identification/reduction engine 210 may iterate through different error reduction operations to determine one or more of those error reduction operations that reduce or minimize the number of errors that result when corresponding data is read.

The method 400 then proceeds to block 412 where the storage device performs the error reduction operation(s). In an embodiment, at block 412, the storage error identification/reduction engine 210 may perform error reduction performance operations that include the storage device processing system 204 performing the error reduction operation(s) determined at block 410, which as discussed above may operate to reduce errors that will result in data that is about to be read, data that was previously read, or data that is simply stored in the storage subsystem 220 and will be read at some time in the future. Furthermore, data reduction operation(s) for particular data may be determined at a first time, and then at a later time may be performed when that particular data is read. As such, the iteration through different error reduction operations discussed above may allow the error reduction operations performed at block 412 to reduce or minimize the number of errors that result when the user data is read.

In a first specific example, user data may be read from the storage subsystem 220 and may undergo the conventional error correction operations discussed above. In the event error correction fails (i.e., the uncorrectable error situation discussed above), the storage error identification data stored in the storage subsystem 220 adjacent that user data may be read and analyzed to identify an expected error rate for that user data, which allows a determination to be made as to whether the number of errors that resulted from the reading of the user data exceeding the capabilities of its corresponding error correction information, or whether that corresponding error correction information should have been capable of correcting those errors. As will be appreciated by one of skill in the art in possession of the present disclosure, such information may be utilized to determine error reduction operations that may include particular error correction algorithms to subsequently implement during failure analysis.

In another specific example, in the case in which user data is unrecoverable, the storage error identification data stored in the storage subsystem 220 adjacent that user data may be read and analyzed to identify the actual data loss mechanism (i.e., which values were most likely to be misread, how many bits flipped, etc.)

In yet another specific example, the blocks 406-412 of the method 400 may be performed periodically (e.g., every day) on the storage subsystem 220 to identify the effects being experienced by the storage subsystem 220, as well as determine appropriate error reduction operations to counteract those effects so that the storage subsystem 220 may operate optimally/the health of the storage subsystem 220 is optimized.

In yet another specific example, different portions of the storage error identification data at different locations (e.g., in the different data storage groups 700) may be read and analyzed as per blocks 406-410 of the method 400 to determine respective error reduction operations that results in the minimum number of errors for each of those portions of the storage error identification data. Each of those error reduction operations may then be analyzed to determine one or more common error reduction operations that operate to reduce errors in each of the portions of the storage error identification data, and those common error reduction operations may be performed on the data storage groups 700 that store the user data prior to reading that user data.

In yet another specific example, the error reduction operations determined via the method 400 may be utilized to calibrate user data retention after some period of storage of the user data in the storage subsystem 220, any may operate to trigger relocation of user data within the storage subsystem 220 in order to ensure data retention. For example, as data stored in any cell ages, the values/states in that cell will start to skew (e.g., similarly as illustrated in FIG. 3B, but to the left in that figure rather than the right as illustrated). In situations where the storage device remains powered, knowing how long the data has been at that location generally indicates when errors may be expected. However, in situations where the storage device is powered off, the storage error identification data may be analyzed to determine the read voltage shifts that are most likely to result in the fewest errors. Furthermore, knowledge of the different values/states of the data allows the use of a "representative" value/state (e.g., a middle value/state like the value "D" or the value "E") and the extrapolation of read voltage shifts from that value/state to other values/states. Such techniques may be enabled by storing (in firmware) an indication of the bits in the storage error identification data that map to that value/state, and then only analyzing those bits in order to reduce the time required for the analysis.

In yet another specific example, the storage error identification data of the present disclosure may be written into power loss data buffers, and then used upon any subsequent power up following a power loss. As will be appreciated by one of skill in the art in possession of the present disclosure, the use of the techniques in the method 500 described above will allow the error analysis for the storage error identification data to be used to determine how long the storage subsystem 220 was without power, the most efficient data recovery operations to perform, and to identify the predominant stress effects on the storage subsystem 220 during the power loss. Furthermore, based on the effects determined to have occurred in the storage error identification data while the storage device was powered off, a time and/or temperature profile for the storage device during the power-off state may be estimated. The time and/or temperature profile for the storage device may then be combined with the initial power-up time for the storage device to create a corresponding time/temperature expectation per block in the storage subsystem, which allows for the generation of a starting read shift value that is expected to compensate for errors. Storage error identification data in the blocks may then be read using that shift to determine whether it is effective or not, and the shift may be iteratively adjusted to improve its error reduction qualities.

Thus, systems and methods have been described that provide for the injection of storage error identification data with a known pattern within user data that is written to a block, and then subsequently read and analyze errors in that storage error identification data based on its known pattern in order to determine error reduction operations to perform before reading the user data. As will be appreciated by one of skill in the art in possession of the present disclosure, the integration of the known pattern storage error identification data with the user data in the storage subsystem allow a variety of flash-based storage subsystem behavior that can produce errors in the user data to be identified. The systems and methods of the present disclosure may be leveraged to increase Qualify of Service (QoS) and reduce average read latencies in storage devices via the use of a feedback mechanism that determines the error reduction operations that will accomplish those goals. Furthermore, the systems and methods of the present disclosure may be utilized with data recovery operations to determine error reduction operations that have to best chances of success in recovering data.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage error identification/reduction system, comprising:
   a storage subsystem including a block;
   a storage error identification/reduction subsystem that is coupled to the storage subsystem and that is configured to:
     receive first data;
     write the first data to a plurality of first storage locations in the block while writing storage error identification data to at least one second storage location in the block that is located adjacent at least one of the plurality of first storage locations, wherein the storage error identification data includes predetermined values that are written to predetermined locations included in the at least one second storage location in the block;
     read the storage error identification data from the at least one second storage location;

identify, based on the predetermined values and predetermined locations of the storage error identification data, errors resulting from the reading of the storage error identification data;

determine, based on the errors, at least one error reduction operation that is configured to reduce errors associated with reading the first data; and perform the at least one error reduction operation.

2. The system of claim 1, wherein the storage error identification/reduction subsystem is configured to:

read, subsequent to performing the at least one error reduction operation, the first data from the plurality of first storage locations, wherein the at least one error reduction operation reduces a number of errors that result from the reading of the first data from the plurality of first storage locations relative to the reading the first data from the plurality of first storage locations without performing the error reduction operation.

3. The system of claim 1, wherein the storage error identification/reduction subsystem is configured to:

generate, based on a storage error identification data equation, the storage error identification data, wherein the errors resulting from the reading of the storage error identification data are identified based on the predetermined values and predetermined locations of the storage error identification data that is generated using the storage error identification data equation.

4. The system of claim 1, wherein the at least one error reduction operation includes a data transformation operation that is configured to reduce errors in the first data read for at least a subset of the plurality of first storage locations in the block.

5. The system of claim 1, wherein the at least one error reduction operation includes shifting a value voltage reference level in cells included in the plurality of first storage locations in the block.

6. The system of claim 1, wherein the identifying the errors resulting from the reading of the storage error identification data based on the predetermined values and predetermined locations of the storage error identification data includes identifying a number of bits in the block that are associated with an error.

7. An Information Handling System (IHS), comprising:
a processing system; and
a memory system that is coupled to the processing system and that includes instructions that, when executed by the processing system, cause the processing system to provide a storage error identification/reduction engine that is configured to:
receive first data;
write the first data to a plurality of first storage locations in a block included in a storage subsystem while writing storage error identification data to at least one second storage location in the block that is located adjacent at least one of the plurality of first storage locations, wherein the storage error identification data includes predetermined values that are written to predetermined locations included in the at least one second storage location in the block;
read the storage error identification data from the at least one second storage location;
identify, based on the predetermined values and predetermined locations of the storage error identification data, errors resulting from the reading of the storage error identification data;

determine, based on the errors, at least one error reduction operation that is configured to reduce errors associated with reading the first data; and
perform the at least one error reduction operation.

8. The IHS of claim 7, wherein the storage error identification/reduction subsystem is configured to:
read, subsequent to performing the at least one error reduction operation, the first data from the plurality of first storage locations, wherein the at least one error reduction operation reduces a number of errors that result from the reading of the first data from the plurality of first storage locations relative to the reading the first data from the plurality of first storage locations without performing the error reduction operation.

9. The IHS of claim 7, wherein the storage error identification/reduction subsystem is configured to:
generate, based on a storage error identification data equation, the storage error identification data, wherein the errors resulting from the reading of the storage error identification data are identified based on the predetermined values and predetermined locations of the storage error identification data that is generated using the storage error identification data equation.

10. The IHS of claim 7, wherein the at least one error reduction operation includes a data transformation operation that is configured to reduce errors in the first data read for at least a subset of the plurality of first storage locations in the block.

11. The IHS of claim 7, wherein the at least one error reduction operation includes shifting a value voltage reference level in cells included in the plurality of first storage locations in the block.

12. The IHS of claim 7, wherein the identifying the errors resulting from the reading of the storage error identification data based on the predetermined values and predetermined locations of the storage error identification data includes identifying a number of bits in the block that are associated with an error.

13. The IHS of claim 7, wherein the at least one error reduction operation is configured to minimize a number of errors that result from the reading of the first data from the plurality of first storage locations.

14. A method for identifying and reducing storage errors, comprising:
receiving, by a storage device, first data;
writing, by the storage device, the first data to a plurality of first storage locations in a block included in a storage subsystem in the storage device while writing storage error identification data to at least one second storage location in the block that is located adjacent at least one of the plurality of first storage locations, wherein the storage error identification data includes predetermined values that are written to predetermined locations included in the at least one second storage location in the block;
reading, by the storage device, the storage error identification data from the at least one second storage location;
identifying, by the storage device based on the predetermined values and predetermined locations of the storage error identification data, errors resulting from the reading of the storage error identification data;
determining, by the storage device based on the errors, at least one error reduction operation that is configured to reduce errors associated with reading the first data; and
performing, by the storage device, the at least one error reduction operation.

15. The method of claim 14, further comprising:

reading, by the storage device subsequent to performing the at least one error reduction operation, the first data from the plurality of first storage locations, wherein the at least one error reduction operation reduces a number of errors that result from the reading of the first data from the plurality of first storage locations relative to the reading the first data from the plurality of first storage locations without performing the error reduction operation.

16. The method of claim 14, further comprising:

generating, by the storage device based on a storage error identification data equation, the storage error identification data, wherein the errors resulting from the reading of the storage error identification data are identified based on the predetermined values and predetermined locations of the storage error identification data that is generated using the storage error identification data equation.

17. The method of claim 14, wherein the at least one error reduction operation includes a data transformation operation that is configured to reduce errors in the first data read for at least a subset of the plurality of first storage locations in the block.

18. The method of claim 14, wherein the at least one error reduction operation includes shifting a value voltage reference level in cells included in the plurality of first storage locations in the block.

19. The method of claim 14, wherein the identifying the errors resulting from the reading of the storage error identification data based on the predetermined values and predetermined locations of the storage error identification data includes identifying a number of bits in the block that are associated with an error.

20. The method of claim 14, wherein the at least one error reduction operation is configured to minimize a number of errors that result from the reading of the first data from the plurality of first storage locations.

\* \* \* \* \*